United States Patent [19]

Wallace

[11] 4,428,982
[45] Jan. 31, 1984

[54] THREAD LOCK

[75] Inventor: Richard B. Wallace, Bloomfield Hills, Mich.

[73] Assignee: The Oakland Corporation, Troy, Mich.

[21] Appl. No.: 379,110

[22] Filed: May 17, 1982

[51] Int. Cl.³ ............................................. B05D 1/36
[52] U.S. Cl. .................................. 427/202; 10/10 R;
411/258; 427/337; 427/372.2; 427/410
[58] Field of Search ............. 10/10 R, 10 P; 411/258;
106/208, 310; 252/194; 427/180, 202, 402, 409,
410, 337, 372.2; 118/DIG. 1

[56] References Cited

U.S. PATENT DOCUMENTS

| | | | |
|---|---|---|---|
| 2,732,799 | 1/1956 | Haslam | 106/310 |
| 3,061,455 | 10/1962 | Anthony | 411/258 |
| 3,489,599 | 1/1970 | Krieble | 411/258 |
| 3,493,432 | 2/1970 | Stewart | 427/202 |
| 3,806,465 | 4/1974 | Karl | 106/208 |
| 4,059,136 | 11/1977 | Wallace | 427/410 |
| 4,074,010 | 2/1978 | Knight | 427/376.2 |
| 4,325,985 | 4/1982 | Wallace | 411/258 |
| 4,369,125 | 1/1983 | Kragen et al. | 106/208 |

Primary Examiner—John H. Newsome
Attorney, Agent, or Firm—Barnes, Kisselle, Raisch, Choate, Whittemore & Hulbert

[57] ABSTRACT

The method of mass producing threaded fasteners having in thread grooves thereof deposits of locking material having a dry non-tacky surface outer surface which permits bulk storage of the fasteners which comprises continuously advancing a series of fasteners through a succession of operating stations to a collection station where the fasteners may be randomly arranged, while eliminating any provision for heating or drying operation, depositing a fluid material in thread grooves of the advancing fasteners, providing a water solution of a film-forming material covering the deposits as the fasteners continue to advance, and providing a light application of a fast acting desiccant in powder form over the film-forming material to convert the film-forming material substantially without significant delay to a non-tacky protective film over the deposits.

12 Claims, 4 Drawing Figures

THREAD LOCK

CROSS REFERENCE TO RELATED APPLICATIONS

The present invention is an improvement over my prior U.S. Pat. No. 4,325,985.

BACKGROUND AND SUMMARY OF THE INVENTION

The present invention represents a substantial improvement in quantity production of previously known friction or adhesive thread lock devices of quite different characteristics, and more specifically relates to improvements in mass production techniques adapted thereto.

The improvements reside primarily in substantial elimination of drying time required to protect fluid deposits on thread area, either permanently, or temperarily as will later appear.

According to a first aspect of the present invention, adjacent fluid deposits are made in thread grooves of a thread fastener of a two-part adhesive, such as an uncured epoxy resin and a conventional polymerizing agent therefor and are permanently protected by a thin, dry, solid, non-tacky cover film applied immediately after deposit of the resin and activator. According to a second aspect of the present invention, an uncured fluid resin is micro-encapsulated, or the resin and an activator therefor are both separately micro-encapsulated, the capsules mixed into a fluid binder, and the fluid binder mixture is deposited on the threads. The fluid binder is temporarily or permanently protected by a thin, dry, solid, non-tacky cover film, through which, if desired, a fluid binder component such as toluene may subsequently be eliminated by evaporation.

Reference is made to prior U.S. Pat. Nos. 3,489,599, 3,746,068 and 3,814,156, of interest herein as disclosing micro-encapsulated bonding materials for fasteners.

First Aspect (Two part, not capsuled)

In its first aspect, the present invention is an improvement over my prior invention disclosed in my U.S. Pat. Nos. 4,059,136, issued Nov. 22, 1977, and 4,081,012 issued Mar. 28, 1978.

In these prior inventions, particularly as it was carried out in commercial production, a series of threaded articles, typically bolts, was advanced while the bolts were suspended on a horizontally moving conveyor with the axes of the bolts vertical. The bolts were heated as they advanced to about 110° F. at which time an uncured fluid resin, such as epoxy, was deposited on one side of the bolt and a fluid activator or hardener was deposited on the opposite side, and the two fluid deposits allowed to flow together. Where the two deposits met, there was an interaction resulting in curing a thin barrier film of the resin which prevented further mixing of the resin and hardener.

The next step was to apply in fluid form a very thin cover coat of a fluid material adapted to transform into a thin, non-tacky, rupturable protective film to protect the still-fluid deposits. The film-forming fluid covering used in commercial practice was polyvinyl alcohol in a water solution. Since this covering material was required to dry sufficiently to permit removal of the bolts from the conveyor and to deposit them on a horizontally advancing belt, it was found necessary to raise the temperature of the bolts to about 135° F. before applying the film-forming material. Thereafter the temperature of the bolts was raised further as they continued to advance on the conveyor while maintained with their axes vertical until they attained a temperature of about 160° F. At this time the PVA was sufficiently dried to permit the bolts to be deposited serially out of contact with each other on a flat horizontally moving belt and thereafter the bolts were maintained at a temperature of about 100° F., to complete drying of the fluid cover material to a thin, solid, dry, non-tacky protective cover film. The finished bolts could then be stored or packaged in bulk without damage.

It was further found that when the uncured resin was a clear or unfilled epoxy resin, it was too fluid if deposited at 110° F. or brought to this temperature after deposit, so it was necessary to increase its viscosity by adding a filler, such as nylon powder, or the like.

In practice the conveyor which advanced the bolts with their axes vertical past stations where the uncured resin and hardener and the protective cover material were applied was about twenty five feet long, and the horizontal belt on which the bolts were deposited and advanced with their axes horizontal required a length of about one hundred feet.

In accordance with the present invention, no heating is required, with very substantial savings in energy, and in addition the space requirements of the equipment are greatly reduced. Where, as preferred, the uncured resin is epoxy, it may be applied clear at temperatures at or not much above a typical room temperature. For example, it and the polymerizing agent or hardener may be applied at 90° F., and at this temperature a suitable clear or unfilled epoxy resin has a viscosity which allows flow around the thread grooves of the bolt from one side thereof into contact with the fluid hardener at the other side of the bolt, but is not sufficiently fluid to flow downwardly across the threads away from the point of deposit, which would leave an insufficient quantity of material at the point of deposit.

This permits the addition of one or a mixture of powdered filler materials to the surface of the fluid resin deposit at a subsequent station where the powder is seen to be in effect drawn into the fluid resin rather than remaining as a surface deposit thereon. A further important advantage is that in this case the filler material may comprise a mixture of two or more different materials such as nylon powder, powdered glass, metal powders such as zinc, powdered graphite, table salt, and particulate material selected for imparting a desired color to the final deposit. It is difficult if not impossible to provide different particulate material in the fluid resin before deposit of the resin and to retain uniform dispersion of the particulate material throughout the resin, and to maintain the desired proportions thereof. However, when the powders are mixed prior to application to the surface of the individual resin deposits, the powder proportions remain constant and the resin-powder proportions may be consistently controlled.

The addition of colored powder to previously deposited clear fluid resin, particularly epoxy resin, to impart a desired color to the resin deposit results in a substantial improvement in appearance and color control over the prior practice where the coloring agent was incorporated into the fluid resin, alone or with one or more particulate filler materials prior to deposit of the resin on the bolts.

In the prior practice, where the protective cover coat was polyvinyl alcohol in an aqueous solution, the final film thickness over the resin was less than that over the hardener or curing agent, because of the affinity of the curing agent for water, and the water rejection of the resin. Accordingly, the application of the fluid cover coat required the use of a material whose viscosity, which controls the thickness of the deposited cover coat, catered to the worst condition. Accordingly, the protective cover film over the curing agent produced a gel as a result of invasion of water of the fluid cover solution into the curing agent.

In accordance with the improved method disclosed herein, a protective cover film is provided by applying in fluid phase an aqueous solution of a film-forming material which is transformed rapidly into a thin, dry, solid, non-tacky protective film by application of a spray of a powdered desiccant onto the surface of the film-forming material.

In a particular successful operation, the resin employed was clear or unfilled epoxy, the curing agent was a fluid aliphatic amine, and the protective material was an aqueous solution of polyvinyl alcohol (PVA).

Second Aspect (capsules)

According to the second aspect of the present invention, the friction or adhesive locking material is a micro-encapsulated, uncured fluid resin and is adapted to be polymerized to form a solid which provides the thread locking action when the capsules are ruptured by threading the article with a mating article.

In one embodiment of this aspect of the invention, the locking material is an uncured resin contained in a fluid anaerobic mixture and the resin is maintained in its fluid unpolymerized condition so long as the mixture is exposed to oxygen as present in ambient atmosphere. Micro-capsules containing the mixture are air-permeable so that the mixture remains fluid in the capsules. The capsules are positioned on a thread surface in such a way that a plurality of micro-capsules are ruptured when the article having a thread surface bearing the micro-capsules is threadedly engaged with a mating threaded article. The anaerobic fluid locking mixture is at least partly retained between mating thread surfaces in such a way that air is excluded, with the result that the resin polymerizes and opposes disengagement between the threaded articles.

A known practice has been to apply this anaerobic fluid directly to a threaded area at the time of use. The requirement for applying the fluid material to individual threaded articles at the time of assembly with mating articles has prevented substantial commercial acceptance of this procedure in large scale commercial production application.

As an alternative to application of the fluid material on individual threaded articles at the time of assembly, it has been proposed to mix the micro-capsules containing the anaerobic mixture with a temporarily fluid binder to produce a fluid material suitable for deposition on a thread area, in which the material will be received mainly in the thread grooves. The binder contains a fluid or liquid solvent which evaporates slowly to convert the binder to a dry, solid, non-tacky material which retains the micro-capsules in position on the thread area, while allowing adequate exposure of the capsules to air to prevent polymerization of the resin.

In a second embodiment of this aspect of the invention, a locking material is provided in the form of a fluid uncured resin adapted to solidify or polymerize when mixed with a hardener.

In this case the uncured resin is micro-encapsulated. The hardener may be separately micro-encapsulated, or it may be mixed directly into a temporarily fluid binder. The capsules containing the uncured resin and the hardener (if encapsulated) are mixed into the binder, and this mixture applied to a threaded area.

In the past, the binder was then dried, as by evaporation of a fluid or liquid component, typically toluene, and became a dry, solid, non-tacky material which supports the capsules on the thread area until use.

When the article containing the capsules was threadedly engaged with a mating threaded member, some of the capsules containing the fluid resin ruptured. This fluid resin was thus exposed to hardener provided in the solidified binder or in separate micro-capsules, and was caused to polymerize to form a solid resin between opposed thread surfaces which established a bond or frictionally opposed relative movement therebetween.

Mass production of these threaded articles in which at least the uncured resin is contained in micro-capsules, requires that the treated articles be prevented from sticking together until the binder has dried. In practice the articles, such as bolts, are advanced on horizontally moving conveyors past an applicator station at which the fluid binder mixture containing the capsules is applied. Thereafter, before the articles are in condition for random agglomeration, it is necessary to dry the binder. This in the past has required lengthening the conveyor system and providing heaters to accelerate the evaporation of the fluid component of the binder.

The present invention as it relates to both embodiments where the uncured resin is deposited in fluid condition on the threads, or is micro-encapsulated, comprises the application of a thin layer of a film-forming aqueous solution of the film-forming material by spray heads at an adjacent station, the material being adapted when a desiccant powder is applied to form a thin, solid, dry, non-tacky protective film over the fluid tacky binder. This film-forming material is applied at room temperature immediately after deposit of the fluid locking material, and is immediately thereafter subjected to the disiccant powder spray, which results in a few seconds in the formation of the non-tacky protective film.

While this film is capable of providing essentially permanent protection, it is noted that where a fluid binder is fluid because of inclusion of a fluid or liquid component subject to evaporation, the protective film permits evaporation of this component and escape of the resulting vapor through the film. A typical component, toluene, will normally evaporate at room temperature over a period of one or two days, leaving the binder in a solid state.

Prior Art

The present application relates to the area of thread lock fasteners, in which separation of mated threaded fasteners is opposed by adhesive or friction material interposed between opposed thread surfaces thereof.

Anthony U.S. Pat. No. 3,061,455 discloses the deposition of a two part adhesive such as an uncured epoxy resin and a hardener, activator, or polymerizer such as a polyamide in contiguous or closely spaced deposits on the threaded portion of a threaded fastener, while in fluid form, and providing a protective coating, such as a vinyl or other suitable material.

Wallace U.S. Pat. No. 4,081,012 discloses the deposition of a two part adhesive such as an uncured epoxy resin and an activator such as an aliphatic amine in fluid condition in adjacent deposits in the thread grooves such that the materials flow into contact and react to form a barrier which prevents substantial mixing of the material until used. A thin protective coating of a film-forming material such as a solution of polyvinyl alcohol (PVA) is applied, as by a spray.

Krieble U.S. Pat. No. 3,489,599 discloses monomers subject to polymerization which are micro-encapsulated and placed on the threads of fasteners. The monomers may be of the type which are polymerized when oxygen is excluded. The patent does not disclose a binder for bonding the capsules to the thread surfaces.

Deckert et al. U.S. Pat. No. 3,746,068 discloses a thread lock in which one or both parts of a two part adhesive (such as uncured epoxy resin and a "non-volatile curative" therefor) are separately micro-encapsulated, and a mixture of the micro-capsules are secured in the thread grooves of a threaded fastener by a binder resin, or a "hot melt" binder.

Bachmann et al. U.S. Pat. No. 3,814,156 discloses a two part adhesive (typically epoxy resin and epoxy hardener) separately micro-encapsulated and secured in the thread grooves of a threaded fastener by binding agents, of which a number are disclosed including polyvinyl alcohol, toluene, varnish-or-tar based resins, etc.

Related Application

In my application, Ser. No. 191,948, now U.S. Pat. No. 4,325,985, I disclose the concept of depositing a fluid material in the thread grooves of a threaded fastener adapted to form solid friction material bonded to the thread surfaces, and thereafter covering the fluid deposit with a special film-forming material which cures after a very brief exposure to radiation, such as ultra-violet radiation. The fluid material may take either of two forms. It may be a two part adhesive, such as a fluid uncured epoxy resin, and a fluid polymerizing agent, i.e., a suitable amine. These adhesive components, in fluid form, are separately applied to adjacent thread areas, and flow together, where they react to form a barrier which prevents further mixing. Alternatively, the fluid material may comprise micro-encapsulated materials in a fluid binder adapted upon evaporation of a solvent such as toluene to form a solid, non-tacky material bonded to the thread surfaces. The micro-encapsulated materials may be a suitable uncured fluid epoxy and a fluid polymerizing material such as a suitable amine. The polymerizing agent may in some cases not be micro-encapsulated but incorporated throughout the binder, to activate the epoxy when the micro-capsules are ruptured.

DETAILED DESCRIPTION

Figure 1:
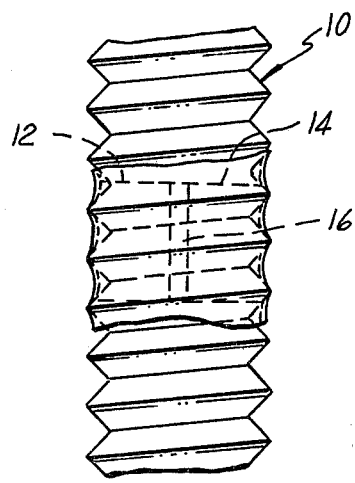
FIG. 1 is a fragmentary elevation of a locking fastener.

The drawing illustrates a precedure applicable to both aspects of the invention.

First Aspect

Reference is first made to the drawing as illustrative of a procedure in accordance with the first aspect of the invention, where the uncured resin remains fluid, and is protected until use only by the protective film.

FIG. 1 is a fragmentary elevational view of a bolt 10 having located in the thread grooves at opposite sides thereof, fluid deposits 12 and 14 of uncured resin and a polymerizing agent therefor. These fluid deposits flow along the thread grooves into contact, where interaction forms a barrier zone 16. Overlying the fluid deposits is a dry, non-tacky, protective film 18, best seen in FIG. 2.

Figure 3:
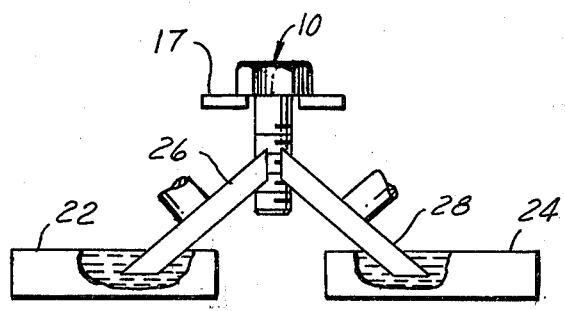
FIG. 3 is a diagrammatic view showing the application of fluid materials to the fasteners.
Figure 4:
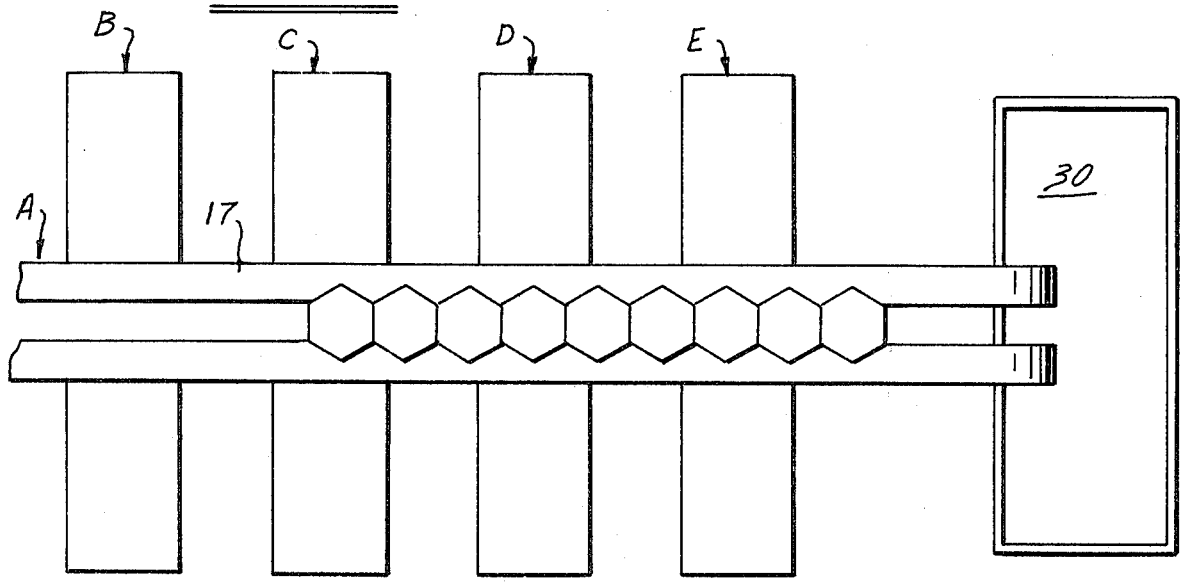
FIG. 4 is a schematic view illustrating the sequence of operations.

As seen in the drawing a series of bolts 10 are applied to a conveyor system comprising a pair of belts 17, between which the bolts are suspended by their heads, as best seen in FIG. 3. The complete system is diagrammatically shown in FIG. 4. The conveyor belts 17 are moving in the direction of the arrow, and the individual bolts are supplied at a loading station A. At this loading station the bolts are at ambient temperature, which may be assumed to be about 70°. In practice, the bolts may be supported with their heads in contact.

At B applicators, details of which may be as seen in FIG. 3, are provided at opposite sides of the advancing array of belts, for depositing for example, controlled amounts of the uncured fluid epoxy resin and a fluid aliphatic amine curing agent. The fluid resin and curing agent have a viscosity such that they flow along the thread grooves into contact with each other, but remain essentially at the axially located zone of deposition, which may extend for two or three threads along the bolt.

Figure 2:
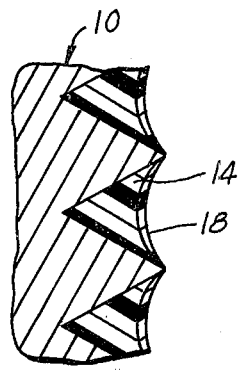
FIG. 2 is an enlarged fragmentary section view of the fastener.

The fluids such as uncured epoxy resin and a polymerizing agent may conveniently be applied to opposite sides of a continuously advancing array of bolts 10 as seen in FIG. 3. Here separate containers 22, 24 for the fluids are provided and inclined rollers 26, 28 transfer the fluid to opposite sides of the fasteners 10. At station C any desired additives are applied, such as nylon particles, color particles, graphite or glass powder, crystals of ordinary table salt, powdered metals, particularly zinc, or mixtures of any of these in selected amounts. The particles are applied to the surfaces of the resin deposits by applicators, which may include spray heads, and if desired may also be applied to the surfaces of the deposits of curing agents. As before noted, the particles appear to be drawn into the fluid deposits, and leave the surfaces thereof smooth and concavely curved as shown in FIG. 2.

Immediately after deposition of the particulate matter, if such is desired, the bolts advance to station D, where a thin application of fluid film-forming material is made, as for example by spraying from spray heads, located at both sides of the twin belts 17, shaped to direct the spray substantially uniformly over the resin and curing agents deposits. The thin film formed thereby is illustrated at 18 in FIG. 2.

The film-forming material is an aqueous solution of a material which when the water is substantially eliminated, forms a continuous, dry, non-tacky protective cover. In order to eliminate the water from the solution, a desiccant in powdered form is sprayed onto the film-forming material at Station E.

Excellent results have been achieved where the film-forming material is a water solution of polyvinyl alcohol (PVA) and where the powdered desiccant is a derivative of guar gum identified by the supplier (Celanese Plastics & Specialties Co., Louisville, KY) as HP-11. This material is a hydroxypropyl galactomannan ether derivative of guar gum, and is a light yellow, relatively free flowing powder, having a particle size such that 90% minimum passes through a 150 Tyler screen, and 40% minimum passes through a 250 Tyler screen.

The powder is applied to the advancing fasteners, immediately after application of the film-forming material, and is applied liberally to supply an excess of the powder, the excess being collected for subsequent use.

The exact mechanics of the formation of a dry, non-tacky protective film is not fully understood. The operation is not one which the supplier of the powder appears to contemplate.

One possible explanation is that the desiccant rapidly takes up the water from the solution, forming a gel which appears to be non-tacky as a result of an excess of the powdered desiccant which did not enter into the gel. This provides a strong non-tacky covering adequate to prevent sticking together of fasteners, but which upon further drying becomes a hard durable permanent protective cover over the underlying deposits.

The protective films 18 are extremely thin (0.0005–0.0015 inches) coatings of film forming material.

Described in more general terms the invention comprises the steps of depositing in the thread grooves of a bolt at circumferentially spaced stations a fluid resin and a fluid curing agent therefor, applying a very thin fluid coating of a quick-settable film-forming material over both of said deposits, and thereafter applying a powdered desiccant to the fluid coating to transform it into a thin continuous solid non-tacky, preferably transparent, protective film which covers the still-fluid deposits in the thread grooves of the bolt. Preferably the above described steps are taken while the bolt is supported with its axis vertical. The fluid resin which is preferably an epoxy resin, has a viscosity at room temperature and up to about 100° F. such that the deposit will flow circumferentially along the thread grooves but will not flow downwardly across threads in any substantial quantity. Accordingly the resin will remain in the axially located zone of deposition and the fluid resin deposit will flow circumferentially into contact with the circumferentially adjacent deposit of the fluid curing agent. Any filler or other additives desired in the finished product are applied in powder form to the surface of the fluid resin deposit and in some cases to the deposit of the fluid curing agent.

Second Aspect

In the foregoing, a specific exercise of the present invention has been described, in which an uncured fluid resin and a fluid activator effective to initiate polymerization of the resin are deposited on a thread zone in side by side relation, and protective film-forming fluid cover material applied over the deposits.

However, the invention is applicable to mass production of threaded articles on which micro-encapsulated uncured resin is carried.

It has heretofore been suggested that thread locks be formed by suitably supporting a liquid or fluid locking material in microscopic pressure-rupturable capsules located in the thread grooves of a threaded article. The capsules are mixed into a fluid binder to produce a fluid mixture suitable for application to the threads. When the binder has dried, the threaded members may be stored without sticking together.

In prior U.S. Pat. No. 3,489,599, the capsules contain an anaerobically polymerizable composition and the material of the capsules is air permeable, so that the composition including the polymerizable monomer, remains fluid. However, when the threaded article is threaded to a companion threaded article, some of the capsules rupture and the fluid monomer is captured in air-excluding relationship between adjacent thread surfaces. This monomer polymerizes into a solid material which provides an adhesive or friction bond between the thread surfaces.

This locking operation is successful but requires either that the fluid mixture be applied in fluid form to the threaded member at the point of use just prior to assembly of mating threaded parts, or encapsulated in microscopic capsules formed of air-permeable material, which are secured to the thread surfaces by ". . . suitable means such as solvent adhesion, a separate coating of adhesive, electro-static attraction etc."

In accordance with the present invention the encapsulated monomer may be mixed with a fluid binder, such for example as a mixture including a volatile fluid adapted to dry to a solid non-tacky condition in which the threaded articles may be stored in bulk at random without sticking together.

In mass production, it is a practical requirement that the treated articles be continuously advanced on suitable conveyor means which holds them separated. Conveniently this may be accomplished by advancing bolts, for example, between parallel belts as illustrated at 12 in FIGS. 3 and 4, and applying the fluid mixture of capsules and fluid binder by brushes, rollers, or the like. Before the treated articles are in condition for random agglomeration, the binder must be rendered non-tacky, and this has in the past required heating the treated articles as they continue to advance, and a greatly increased conveyor length. The former is wasteful of the energy required to heat the articles, and the latter is wasteful of space.

In accordance with the present invention, the fluid mixture of micro-capsules and a fluid binder containing a volatile liquid, such as toluene, is applied serially to the articles as they pass an applicator station. This may be the Station B in FIG. 4, where the mixture may be applied at one side of the articles 10, or at both sides. In the latter case, the fluid mixture may flow around the thread grooves to form a 360° ring. The fluidity however is preferably such as to prevent substantial flow axially downwardly across thread grooves.

Substantially immediately after application of the fluid mixture, a thin liquid coating of the film-forming material disclosed herein is applied as in the form of a spray, covering the still-fluid mixture. This application may take place at Station D in FIG. 4.

Immediately after the application of the film-forming material, the articles traverse Station E, where the film-forming material has applied thereto a spray of desiccant powder. This has the effect of converting the fluid film-forming material into a dry, non-tacky protective film.

The film thus produced is air-permeable, so that oxygen continues to reach the micro-capsules to prevent polymerization of the encapsulated anaerobic monomer.

The film covers the deposit on the thread, so that it is non-tacky. Immediately after treatment by the desiccant powder, the articles may be discharged from conveyor 12 and randomly agglomerated and/or collected in containers on belt 30 without sticking together. A further advantage is that the air-permeable film permits escape of the volatile component of the binder. Where this component is toluene it is found that it will have been eliminated in a day or two, at room temperature.

By the practice of the foregoing, it has been found that the equipment may be a 15 foot conveyor run at 38'/min as compared to a 100 foot conveyor run at 14'/min required in the past.

In prior U.S. Pat. No. 3,746,068 there is suggested micro-encapsulation of an unpolymerized resin, such as 1, 2-epoxy resins and mixing these capsules into a fluid binder or adhesive to produce a fluid mixture suitable for application to the threads of a threaded article. The binder includes a curing agent for the resin, and various amines are disclosed as suitable. The binders disclosed in this patent all include fluids or liquids capable of being eliminated by evaporation. In general, toluene is the preferred liquid, and this material is volatile and evaporates, but a protracted drying period usually with concurrent heating is required.

In accordance with the present invention, the fluid deposit including the micro-capsules is provided with a spray coating of film-forming, fluid material, and immediately thereafter is subjected to the powder spray. The film forms substantially immediately and the treated articles may be placed at random in containers. Again, the volatile component of the binder escapes through the film, and the binder thus may solidify over a period of one or more days. However, no special additional handling of the treated articles is necessary after powder spray.

Thus it will be apparent that the present invention has the result of effecting major economies in energy, space, and time in large scale mass production of threaded articles provided with a patch or area of friction-producing material applied in fluid form and substantially immediately protected by a dry, solid, non-tacky film which permits correspondingly immediate random agglomeration of the articles. The locking material, or a component thereof, may remain in liquid or fluid condition and be protected only by the protective film. Alternatively, the locking material or a component thereof, may be micro-encapsulated and the capsules retained on the threads by a binder which itself is applied in fluid condition and protected by the film, either permanently, or until a liquid component of the binder has escaped by evaporation.

Reference is made herein to the temperatures at which the deposition of lock-forming material is made, and the temperatures at which the coating of film-forming material is provided.

These temperatures are broadly defined as within normal room-temperature ranges or manual handling temperatures, to differentiate sharply from depositions at highly elevated temperatures, such as the deposition of nylon powder on thread surfaces above the melting temperature of nylon, or subsequent heating of powder deposits on thread surfaces to a temperature sufficient to melt the powder.

Specifically reference has been made to temperatures of less than 100° F., as for example 90° F. prevailing at the time of deposit of the lock-forming material on the threads, which are considered to be within a normal room temperature range.

Advantages of Both Aspects

In the foregoing two separate aspects of the invention have been discussed. In one the polymerizable resin is applied in fluid form directly to the threads and a second fluid deposit of a curing agent is also provided adjacent the resin and directly on the threads. These fluid deposits are covered and protected with the protective film discussed in the foregoing.

In the second aspect of the invention, the polymerizable resin is provided in micro-encapsulated form and may be an anaerobic resin or it may be a resin which requires a curing agent to polymerize. In either case the micro-encapsulated material is applied in a fluid binder and it is this fluid binder which is protected, either temporarily or permanently, by the protective film.

Thus in both cases the protective film is applied over a fluid material, and is rapidly cured to provide a thin, dry, non-tacky protective film which permits the threaded bolts to be randomly accumulated immediately after the cure of the protective film.

In mass production of the articles, an essential feature is the continuous movement of a succession of articles through closely adjacent station to apply the fluid deposit, to apply the film-forming coating, and to cure the coating, at which time the articles are completed, all without the necessity of and substantial time delay between stations, or after the desiccant treatment. In a commercial practice of the invention, the overall length of the conveyor line was only fifteen feet long, and the conveyor was run at 38'/minute. Adjacent articles on the conveyor may have heads in contact so that if bolt heats are ⅜", the line capacity will approach 1,000 pieces per minute.

Since it appears that the action of the guar gum derivative powder is to extract water from the aqueous solution of PVA, this powder is referred to herein as a desiccant.

What is claimed is:

1. The method of mass producing self locking threaded fasteners having material deposited in thread grooves thereof to be activated by engagement with a mating threaded member, which comprises continuously advancing a series of threaded fasteners, depositing in thread grooves of the fasteners as they continue to advance a fluid locking material capable of activation by engagement with mating threaded members to oppose disengagement between mated fasteners and members, applying over the entire exposed surface of the fluid locking material in thread grooves of the fasteners a continuous thin coating of a fluid film-forming material as the fasteners continue to advance, and applying a quick-acting film-activating material throughout the exposed surface of the film-forming material as the fasteners continue to advance to convert the fluid film-forming material to a thin continuous non-tacky protective film over the still fluid deposits of locking material in the thread grooves of the fasteners.

2. The method as defined in claim 1 in which the fasteners are headed bolts, which comprises continuously advancing the fasteners with their axes vertical along horizontal support surfaces engaged beneath the heads of the fasteners.

3. The method as defined in claim 2, which comprises transferring fluid locking material from one or more open topped receptacles therefor to the bolts as the fasteners continue as advance by inclined rollers which dip into the receptacles and roll against the sides of the bolts.

4. The method as defined in claim 1, which comprises depositing the fluid film-forming material by spraying it over the deposited locking material in the thread grooves.

5. The method as defined in claim 4, in which the film-activating material is a fine powder, which comprises applying it in a spray over the fluid film-forming coating on the still fluid locking material.

6. The method as defined in claim 5, in which the fluid film-forming material has a water component, and in which the film-activating material is a desiccant which extracts water from the fluid film-forming material to convert the film-forming material to a continuous, non-tacky, protective film completely covering the still fluid locking material in the thread grooves.

7. The method as defined in claim 6, in which the fluid locking material is a two-part adhesive, which comprises depositing the different parts of the adhesive in contiguous deposits in the thread grooves for intermixture only when the fasteners are engaged with mating fastening members.

8. The method as defined in claim 6, in which the fluid locking material comprises micro-encapsulated locking material in a fluid binder.

9. The method as defined in claim 6, in which the film-forming material is an aqueous solution of polyvinyl alcohol, and in which the film-activating material is a desiccant powder.

10. The method as defined in claim 9, in which the desiccant powder is a derivative of guar gum.

11. The method as defined in claim 10, in which the desiccant powder is a hydroxypropyl galactomannan ether derivative of guar gum.

12. The method as defined in claim 11, in which the desiccant powder is a light yellow, free flowing powder having a particle size distribution: 90% Minimum to pass through 150 Tyler screen, 40% Minimum to pass through 250 Tyler screen.

* * * * *